(12) United States Patent  
Cicero et al.

(10) Patent No.: US 11,782,019 B2
(45) Date of Patent: Oct. 10, 2023

(54) SURFACE TREATMENT OF SEMICONDUCTOR SENSORS

(71) Applicant: Life Technologies Corporation, Carlsbad, CA (US)

(72) Inventors: Ronald L. Cicero, Menlo Park, CA (US); Marc Glazer, San Jose, CA (US); Yufang Wang, San Carlos, CA (US); Christina E Inman, San Mateo, CA (US); Jeremy Gray, Larkspur, CA (US); Joseph Koscinski, Richmond, CA (US); James A. Ball, Ledyard, CT (US); Phil Waggoner, Guilford, CT (US); Alexander Mastroianni, Alameda, CA (US)

(73) Assignee: Life Technologies Corporation, Carlsbad, CA (US)

( * ) Notice: Subject to any disclaimer, the term of this patent is extended or adjusted under 35 U.S.C. 154(b) by 578 days.

(21) Appl. No.: 17/060,680

(22) Filed: Oct. 1, 2020

(65) Prior Publication Data

US 2021/0102916 A1  Apr. 8, 2021

Related U.S. Application Data

(63) Continuation of application No. 14/789,795, filed on Jul. 1, 2015, now Pat. No. 10,809,225.

(60) Provisional application No. 62/020,299, filed on Jul. 2, 2014.

(51) Int. Cl.
   *G01N 27/414* (2006.01)

(52) U.S. Cl.
   CPC ................. *G01N 27/4145* (2013.01)

(58) Field of Classification Search
   CPC .................................................. G01N 27/4145
   See application file for complete search history.

(56) References Cited

U.S. PATENT DOCUMENTS

| | | |
|---|---|---|
| 4,425,384 A | 1/1984 | Brownscombe |
| 4,480,005 A | 10/1984 | Brownscombe |
| 4,522,977 A | 6/1985 | Gardner |
| 4,522,978 A | 6/1985 | Gardner |
| 4,532,296 A | 7/1985 | Gardner |
| 4,532,297 A | 7/1985 | Gardner |
| 4,599,401 A | 7/1986 | Koleske |

(Continued)

FOREIGN PATENT DOCUMENTS

| | | |
|---|---|---|
| CN | 103221810 A | 7/2013 |
| EP | 1348951 A1 | 10/2003 |

(Continued)

OTHER PUBLICATIONS

Notice of Refusal dated Jan. 1, 2021, to JP Patent Application No. 2020-068343.

(Continued)

*Primary Examiner* — Robert J Eom

(57) ABSTRACT

A sensor component includes a sensor including a sensor surface and a reaction site in cooperation with the sensor and exposing the sensor surface. The reaction site including a reaction site surface. A surface agent is bound to the reaction site surface or the sensor surface. The surface agent includes a surface active functional group reactive with Bronsted base or Lewis acid functionality on the reaction site surface or the sensor surface and including distal functionality that does not have a donor electron pair.

21 Claims, 6 Drawing Sheets

(56) References Cited

U.S. PATENT DOCUMENTS

| | | | |
|---|---|---|---|
| 4,626,570 | A | 12/1986 | Gardner |
| 4,629,779 | A | 12/1986 | Koleske |
| 5,350,701 | A | 9/1994 | Jaffrezic-Renault et al. |
| 6,884,628 | B2 | 4/2005 | Hubbell et al. |
| 7,166,327 | B2 | 1/2007 | Afzali-Ardakani et al. |
| 7,686,929 | B2 | 3/2010 | Toumazou et al. |
| 8,034,395 | B2 | 10/2011 | Hofer et al. |
| 8,193,123 | B2 | 6/2012 | Rank et al. |
| 8,236,493 | B2 | 8/2012 | Lockhart et al. |
| 8,410,027 | B2 | 4/2013 | Gao et al. |
| 8,501,406 | B1 | 8/2013 | Gray et al. |
| 8,535,513 | B2 | 9/2013 | Rothberg et al. |
| 8,715,932 | B2 | 5/2014 | Su et al. |
| 8,735,077 | B2 | 5/2014 | Shim et al. |
| 9,091,647 | B2 | 7/2015 | Chang et al. |
| 9,110,014 | B2 | 8/2015 | Afzali-Ardakani et al. |
| 9,139,667 | B2 | 9/2015 | Menchen et al. |
| 2003/0186914 | A1 | 10/2003 | Hofer et al. |
| 2005/0053524 | A1 | 3/2005 | Keersmaecker et al. |
| 2008/0241892 | A1 | 10/2008 | Roitman et al. |
| 2009/0220749 | A1 | 9/2009 | O'Donoghue et al. |
| 2010/0072976 | A1 | 3/2010 | Sheu et al. |
| 2010/0197507 | A1 | 8/2010 | Rothberg et al. |
| 2011/0300534 | A1 | 12/2011 | Chiou et al. |
| 2012/0045368 | A1 | 2/2012 | Hinz et al. |
| 2012/0114974 | A1 | 5/2012 | Hotchkiss et al. |
| 2012/0304741 | A1 | 12/2012 | Roy et al. |
| 2013/0189158 | A1 | 7/2013 | Li et al. |
| 2014/0080717 | A1 | 3/2014 | Li et al. |
| 2014/0106338 | A1 | 4/2014 | Fischer |
| 2014/0120630 | A1 | 5/2014 | Ren et al. |
| 2014/0190592 | A1 | 7/2014 | Uchikawa et al. |
| 2015/0184237 | A1 | 7/2015 | Su et al. |

FOREIGN PATENT DOCUMENTS

| | | |
|---|---|---|
| EP | 1766090 B1 | 4/2011 |
| EP | 2677309 B1 | 7/2014 |
| JP | H06503641 A | 4/1994 |
| JP | 2010513869 A | 4/2010 |
| JP | 2012522824 A | 9/2012 |
| WO | WO-1992005435 A1 | 4/1992 |
| WO | WO-2005047904 A2 | 5/2005 |
| WO | WO-2008076406 A2 | 6/2008 |
| WO | WO-2010115854 A1 | 10/2010 |
| WO | WO-2012024500 A1 | 2/2012 |
| WO | WO-2013090364 A1 | 6/2013 |

OTHER PUBLICATIONS

Examination Report dated Oct. 23, 2020, to IN Patent Application No. 2017003274.

Cattani-Scholz, Anna, et al. "Organophosphonate-based PNA-functionalization of silicon nanowires for label-free DNA detection." ACS nano 2.8 (2008): 1653-1660.

Clausen et al., "Chromatographic Characterization of Phosphonate Analog EDTA-Modified Zirconia Support for Biochromatographic Applications", Analytical Chemistry, vol. 70, No. 2, Jan. 15, 1998, pp. 378-385.

Dojin News, "Phosphonic Acid Derivatives for Metal Oxide Surface Treatment", No. 146, 2013, pp. 16 to 18.

EP Examination Report mailed to corresponding EP Application No. 15738556.8, dated Apr. 9, 2020.

Hu et al., "Synthesis and Characterization of New Zirconia-Based Polymeric Cation-Exchange Stationary Phases for High-Performance Liquid Chromatography of Proteins", Analytical Chemistry, vol. 70, No. 9, 1998, pp. 1934-1942.

Li, Hui, et al. "Mesoporous phosphonate-TiO 2 nanoparticles for simultaneous bioresponsive sensing and controlled drug release." Analyst 138.4 (2013): 1084-1090.

Nakazato, "An Integrated ISFET Sensor Array", Sensors, Nov. 2009, vol. 9, No. 11, ISSN:1424-8220, [online], Internet, URL, http://www.mdpi.com/1424-8220/9/11/8831/pdf, Nov. 2009, pp. 8831-8851.

Nawrocki et al., "Chemistry of Zirconia and its use in Chromatography", Journal of Chromatography A, vol. 657, No. 2, Dec. 1993, pp. 229-282.

Nawrocki et al., "New Materials for Biotechnology: Chromatographic Stationary Phases Based on Zirconia", Biotechnology Progress, vol. 10, No. 6, 1994, pp. 561-573.

Nawrocki et al., "Part 1: Chromatography using ultra-stable metal oxide-based stationary phases for HPLC", Journal of Chromatography A, vol. 1028, No. 1, Feb. 27, 2004, pp. 1-30.

Nawrocki et al., "Part II: Chromatography using ultra-stable metal oxide-based stationary phases for HPLC", Journal of Chromatography A, vol. 1028, No. 1, Feb. 27, 2004, pp. 31-62.

PCT/US2015/038894, , "International Search Report and Written Opinion of the International Searching Authority", dated Oct. 15, 2015, 17 pages.

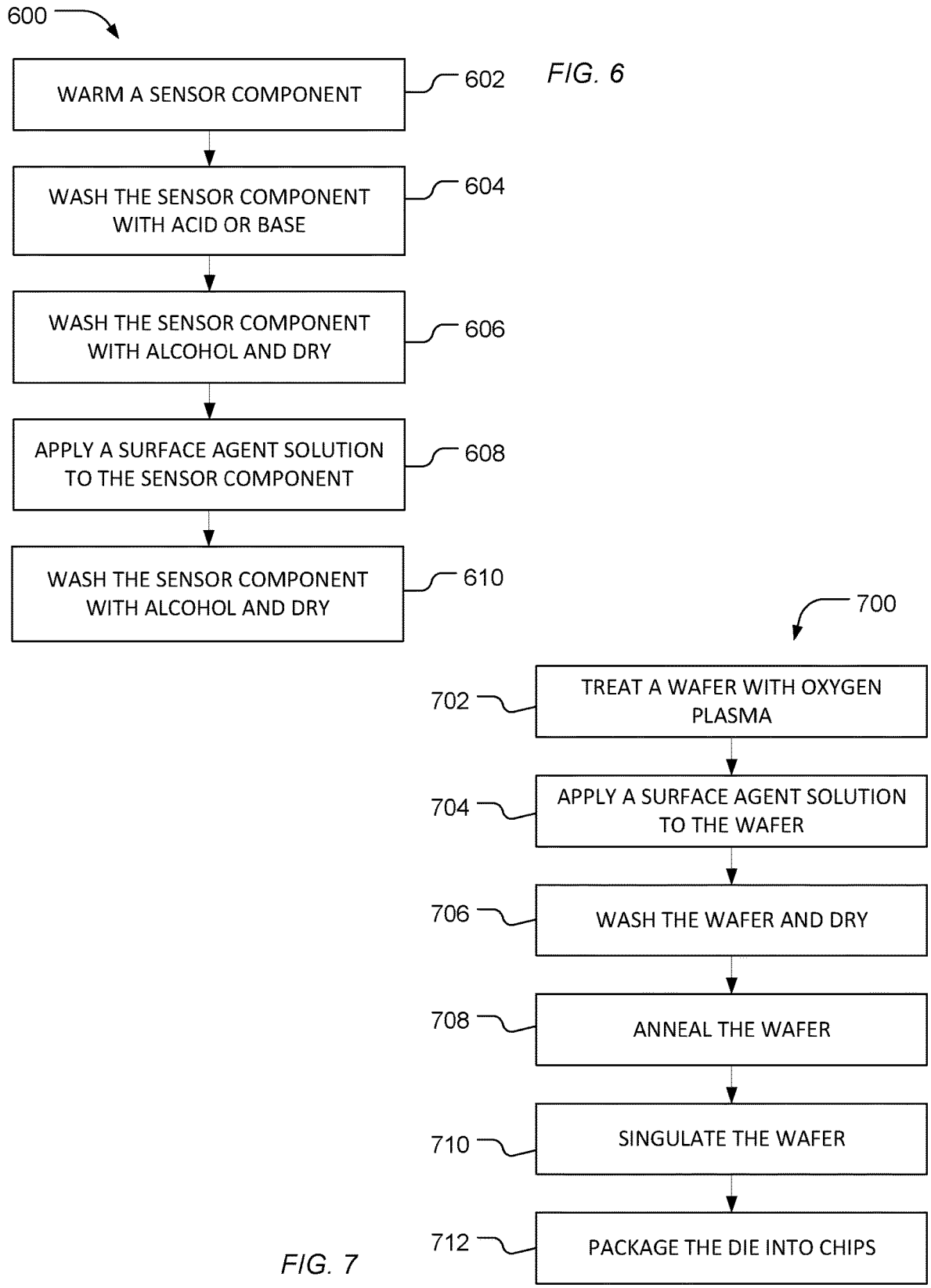

SURFACE TREATMENT OF SEMICONDUCTOR SENSORS

CROSS-REFERENCE TO RELATED APPLICATION(S)

This application is a continuation of U.S. patent application Ser. No. 14/789,795, filed Jul. 1, 2015. U.S. patent application Ser. No. 14/789,795 claims benefit of U.S. Provisional Application No. 62/020,299, filed Jul. 2, 2014, which is incorporated herein by reference in its entirety.

FIELD OF THE DISCLOSURE

This disclosure, in general, relates to systems and methods for treating the surface of semiconductor sensors and the treated semiconductor sensors.

BACKGROUND

Arrays of sensors formed in semiconductor substrates are increasingly being used in fields such as analytical chemistry and molecular biology. For example, when analytes are captured on or near sensor pads of a sensor array, the analytes or byproducts of reactions associated with the analytes can be detected and used to elucidate information regarding the analyte. In particular, such sensor arrays have found use in genetic analysis, such as genetic sequencing or quantitative amplification.

During manufacture, various semiconductor processing techniques can alter the nature of the surface of a sensor array and the surface of well structures around the sensor array. Such processing can also leave residues on the surface or alter surface oxidation. Such altered surface chemistry can prevent or limit the capture of analytes proximate to the sensors. As such, the effectiveness of such sensor arrays is reduced and signals resulting from such sensor arrays may include erroneous data or no data.

SUMMARY

In an example, a surface agent is deposited over surfaces adjacent to or on sensor surfaces. Such surface agents can be deposited on the sensor surfaces when the sensors are in the form of a sensor component or alternatively, when the sensors are disposed in a wafer prior to singulating the wafer into die that can be packaged into sensor components.

In a particular example, a sensor component includes an array of field effect transistor (FET) based sensors and a corresponding array of reaction sites, e.g., wells. One or more surface agents can be disposed on the surfaces of the array of FET-based sensors or the surfaces of the wells.

BRIEF DESCRIPTION OF THE DRAWINGS

The present disclosure may be better understood, and its numerous features and advantages made apparent to those skilled in the art by referencing the accompanying drawings.

FIG. 6 and FIG. 7 include flow diagrams illustrating exemplary methods for treating a semiconductor sensor.

The use of the same reference symbols in different drawings indicates similar or identical items.

DETAILED DESCRIPTION

In an exemplary embodiment, a sensor component has a sensor and a reaction site disposed in cooperation with the sensor. The reaction site can be a well, channel, groove, pit, dimple, or other similar structure. For example, the reaction site can be a well. A surface agent can bind to sidewalls of the reaction site or a surface of the sensor. The surface agent can include a functional group reactive with Bronsted base structures or Lewis acid structures on the surfaces and can include distal functionality that does not have donor electron pairs or lacks Bronsted base or acid functionality. The surface agent can be applied to the surfaces during wafer processing or after singulation of the wafer and formation of the sensor component.

In an exemplary embodiment, a sensor component includes an array of wells associated with a sensor array. The sensors of the sensor array can include field effect transistor (FET) sensors, such as ion sensitive field effect transistors (ISFET). In an example, the wells have a depth or thickness in a range of 100 nm to 10 micrometers. In another example, the wells can have a characteristic diameter in a range of 0.1 micrometers to 2 micrometers. The sensor component can form part of a sequencing system.

Figure 1:
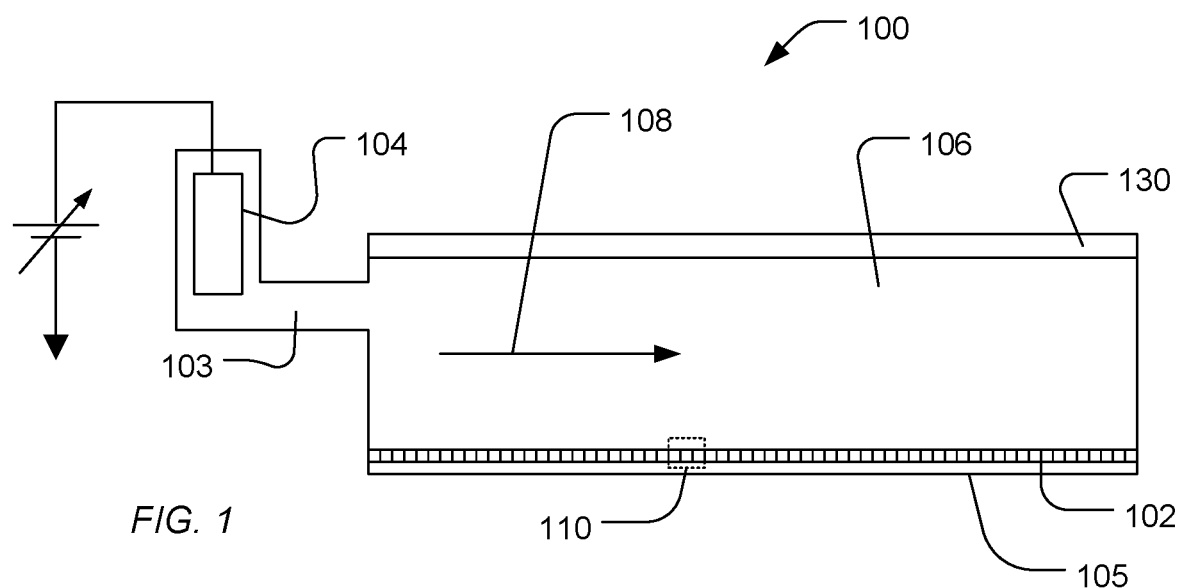
FIG. 1 includes an illustration of an exemplary measurement system.

In a particular example, a sequencing system includes a flow cell in which a sensory array is disposed, includes communication circuitry in electronic communication with the sensory array, and includes containers and fluid controls in fluidic communication with the flow cell. In an example, FIG. 1 illustrates an expanded and cross-sectional view of a flow cell 100 and illustrates a portion of a flow chamber 106. A reagent 108 flows across a surface of a well array 102, in which the reagent 108 flows over the open ends of wells of the well array 102. The well array 102 and a sensor array 105 together can form an integrated unit forming a lower wall (or floor) of the flow cell 100. A reference electrode 104 can be fluidically coupled to the flow chamber 106. Further, a flow cell cover 130 encapsulates the flow chamber 106 to contain the reagent 108 within a confined region.

Figure 2:
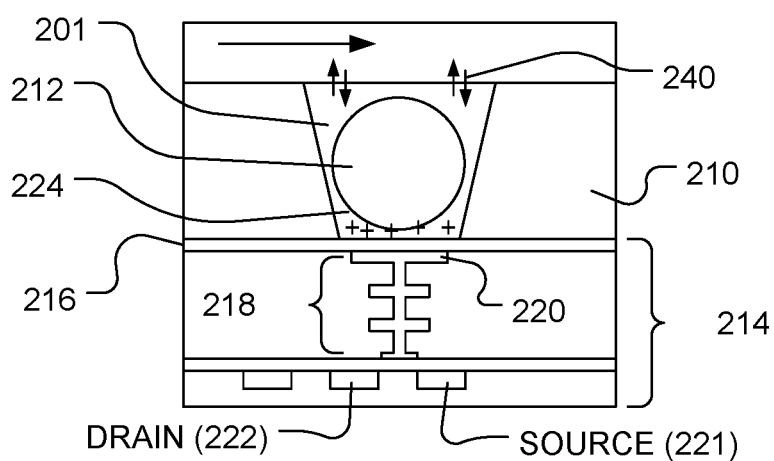
FIG. 2 includes an illustration of an exemplary measurement component.

FIG. 2 illustrates an expanded view of a well 201 and a sensor 214, as illustrated at 110 of FIG. 1. The volume, shape, aspect ratio (such as base width-to-well depth ratio), and other dimensional characteristics of the wells can be selected based on the nature of the reaction taking place, as well as the reagents, byproducts, or labeling techniques (if any) that are employed. The sensor 214 can be a chemical field-effect transistor (chemFET), more specifically an ion-sensitive FET (ISFET), with a floating gate 218 having a sensor plate 220 optionally separated from the well interior by a material layer 216, which defines a sensor surface. In addition, a conductive layer (not illustrated) can be disposed over the sensor plate 220. In an example, the material layer 216 includes an ion sensitive material layer. The material layer 216 can be a ceramic layer, such as an oxide of zirconium, hafnium, tantalum, aluminum, or titanium, among others, or a nitride of titanium. Alternatively, the material layer 216 can be formed of a metal, such as titanium, tungsten, gold, silver, platinum, aluminum, copper, or a combination thereof. In an example, the material layer 216 can have a thickness in a range of 5 nm to 100 nm, such as a range of 10 nm to 70 nm, a range of 15 nm to 65 nm, or even a range of 20 nm to 50 nm.

While the material layer 216 is illustrated as extending beyond the bounds of the illustrated FET component, the material layer 216 can extend along the bottom of the well 201 and optionally along the walls of the well 201. The sensor 214 can be responsive to (and generate an output signal related to) the amount of a charge 224 present on the material layer 216 opposite the sensor plate 220. Changes in the charge 224 can cause changes in a current between a source 221 and a drain 222 of the chemFET. In turn, the chemFET can be used directly to provide a current-based output signal or indirectly with additional circuitry to provide a voltage-based output signal. Reactants, wash solutions, and other reagents can move in and out of the wells by a diffusion mechanism 240.

In an embodiment, reactions carried out in the well 201 can be analytical reactions to identify or determine characteristics or properties of an analyte of interest. Such reactions can generate directly or indirectly byproducts that affect the amount of charge adjacent to the sensor plate 220. If such byproducts are produced in small amounts or rapidly decay or react with other constituents, multiple copies of the same analyte can be analyzed in the well 201 at the same time in order to increase the output signal generated. In an embodiment, multiple copies of an analyte can be attached to a solid phase support 212, either before or after deposition into the well 201. The solid phase support 212 can be a polymer matrix, such as a hydrophilic polymer matrix, for example, a hydrogel matrix or the like. For simplicity and ease of explanation, solid phase support 212 is also referred herein as a polymer matrix.

The well 201 can be defined by a wall structure, which can be formed of one or more layers of material. In an example, the wall structure can have a thickness extending from the lower surface to the upper surface of the well in a range of 0.01 micrometers to 10 micrometers, such as a range of 0.05 micrometers to 10 micrometers, a range of 0.1 micrometers to 10 micrometers, a range of 0.3 micrometers to 10 micrometers, or a range of 0.5 micrometers to 6 micrometers. In particular, the thickness can be in a range of 0.01 micrometers to 1 micrometer, such as a range of 0.05 micrometers to 0.5 micrometers, or a range of 0.05 micrometers to 0.3 micrometers. The wells 201 can have a characteristic diameter, defined as the square root of 4 times the cross-sectional area (A) divided by Pi (e.g., sqrt(4*A/π)), of not greater than 5 micrometers, such as not greater than 3.5 micrometers, not greater than 2.0 micrometers, not greater than 1.6 micrometers, not greater than 1.0 micrometers, not greater than 0.8 micrometers or even not greater than 0.6 micrometers. In an example, the wells 201 can have a characteristic diameter of at least 0.01 micrometers. In a further example, the well 201 can define a volume in a range of 0.05 fL to 10 pL, such as a volume in a range of 0.05 fL to 1 pL, a range of 0.05 fL to 100 fL, a range of 0.05 fL to 10 fL, or even a range of 0.1 fL to 5 fL.

While FIG. 2 illustrates a single-layer wall structure and a single-layer material layer 216, the system can include one or more wall structure layers, one or more conductive layers or one or more material layers. For example, the wall structure can be formed of one or more layers, including an oxide of silicon or TEOS or including a nitride of silicon.

Figure 3:
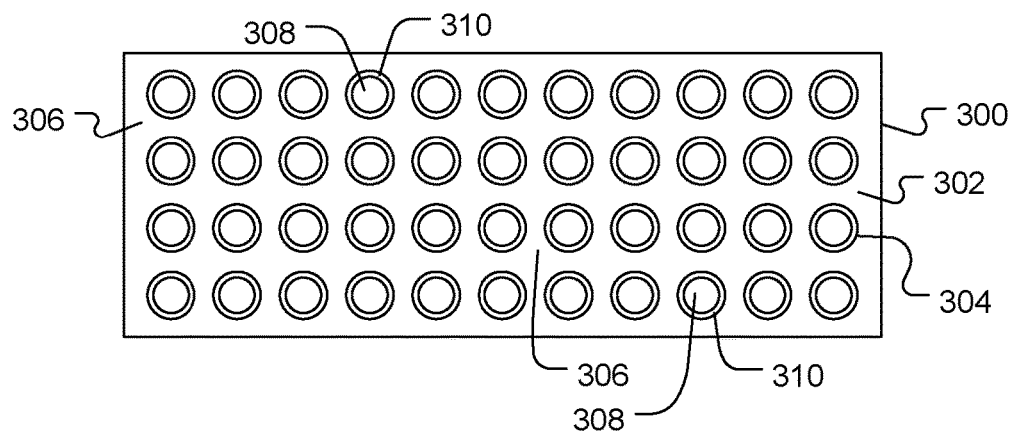
FIG. 3 includes an illustration of exemplary array of measurement components.

In a particular example illustrated in FIG. 3, a system 300 includes a well wall structure 302 defining an array of wells 304 disposed over or operatively coupled to sensor pads of a sensor array. The well wall structure 302 defines an upper surface 306. A lower surface 308 associated with the well is disposed over a sensor pad of the sensor array. The well wall structure 302 defines a sidewall 310 between the upper surface 306 and the lower surface 308. As described above, a material layer in contact with sensor pads of the sensor array can extend along the lower surface 308 of a well of the array of wells 304 or along at least a portion of the wall 310 defined by the well wall structure 302 and defines a sensor surface. The upper surface 306 can be free of the material layer.

Figure 4:
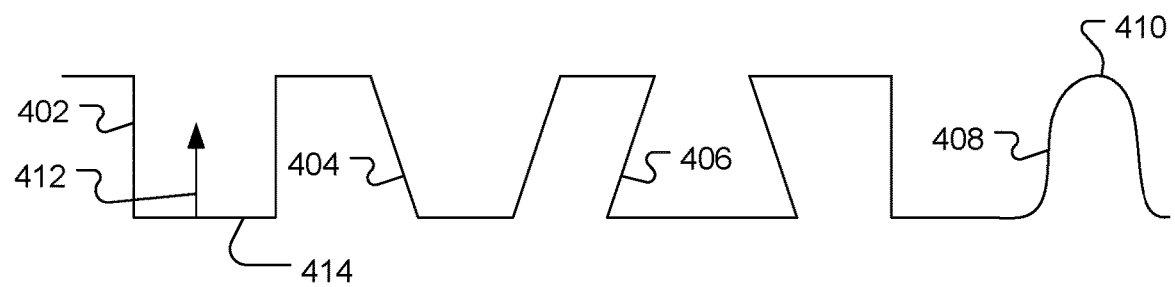
FIG. 4 includes an illustration of exemplary well configurations.

While the wall surface of FIG. 2 is illustrated as extending substantially vertically and outwardly, the wall surface can extend in various directions and have various shapes. Substantially vertically denotes extending in a direction having a component that is normal to the surface defined by the sensor pad. For example, as illustrated in FIG. 4, a well wall 402 can extend vertically, being parallel to a normal component 412 of a surface defined by a sensor pad. In another example, the wall surface 404 extends substantially vertically, in an outward direction away from the sensor pad, providing a larger opening to the well than the area of the lower surface of the well. As illustrated in FIG. 4, the wall surface 404 extends in a direction having a vertical component parallel to the normal component 412 of the surface 414. In an alternative example, a wall surface 406 extends substantially vertically in an inward direction, providing an opening area that is smaller than an area of the lower surface of the well. The wall surface 406 extends in a direction having a component parallel to the normal component 412 of the surface 414.

While the surfaces 402, 404, or 406 are illustrated by straight lines, some semiconductor or CMOS manufacturing processes can result in structures having nonlinear shapes. In particular, wall surfaces, such as wall surface 408 and upper surfaces, such as upper surface 410, can be arcuate in shape or take various nonlinear forms. While the structures and devices illustrated herewith are depicted as having linear layers, surfaces, or shapes, actual layers, surfaces, or shapes resulting from semiconductor processing can differ to some degree, possibly including nonlinear and arcuate variations of the illustrated embodiment.

Figure 5:
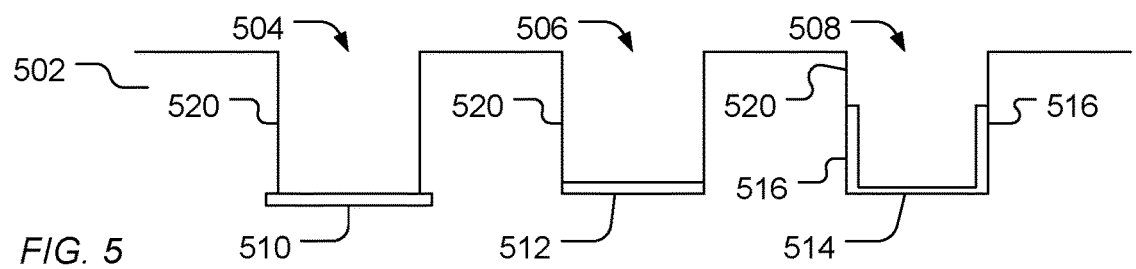
FIG. 5 includes an illustration of exemplary well and sensor configurations.

FIG. 5 includes an illustration of exemplary wells including ion sensitive material layers. For example, a well structure 502 can define an array of wells, such as exemplary wells 504, 506, or 508. The wells (504, 506, or 508) can be operatively coupled to an underlying sensor (not illustrated) or linked to such an underlying sensor. Exemplary well 504 includes an ion sensitive material layer 510 defining the bottom of the well 504 and sensor surface and extending into the structure 502. While not illustrated in FIG. 5, a conductive layer, such as a gate, for example, a floating gate of ion sensitive field effect transistor can reside below the ion sensitive material layer 510.

In another example, as illustrated by well 506, an ion sensitive material layer 512 can define the bottom of the well 506 and sensor surface without extending into the structure 502. In a further example, a well 508 can include an ion sensitive layer 514 that extends along at least a portion of a sidewall 516 of the well 508 defined by the structure 502. As above, the ion sensitive material layers 512 or 514 can reside over conductive layers or gates of underlying electronic devices and can define sensor surfaces.

In a particular example, the sidewalls 520 of the wells (504, 506, or 508) can be formed of metals, semi-metals, oxides thereof, or nitrides thereof, or a combination thereof. Exemplary metals include gold, silver, platinum, copper, aluminum, tungsten, titanium, or a combination thereof. An exemplary semi-metal includes silicon. In an example, the sidewalls can be formed of the silicon dioxide, silicon nitride, TEOS, or a combination thereof. In particular, the sidewalls 520 can be formed of one or more layers of one or more of the above materials.

Surfaces of the sensors (e.g., material layers 510, 512, or 514) can be formed of metals, semi-metals, oxides thereof, or nitrides thereof, or combinations thereof. Exemplary metals include tungsten, titanium, tantalum, hafnium, aluminum, zirconium, gold, silver, platinum, copper, or combinations thereof. Exemplary oxides or nitrides include titanium dioxide, titanium nitride, tantalum oxide, hafnium oxide, zirconia, alumina, or combinations thereof.

In a particular example, the surfaces of the sidewalls 520 or the surfaces of the sensors (510, 512, or 514) can exhibit Bronsted base functionality, such as surface hydroxyl groups or μ-oxo groups, or Lewis acid functionality at transition metal centers. Even in some nitrides, at least partial oxidation of the surface results in formation of surface hydroxyl groups or other Bronsted base structures, particularly in the presence of aqueous solutions. Such hydroxyl groups have been demonstrated to exhibit buffering, slowing the response of sensors to ionic byproducts of reactions, such as acid protons or hydronium ions, or to changes in pH. For metal ceramic surfaces, surface metal centers can behave like Lewis acid sites.

In an example, a surface agent can bind to the sidewalls 520 and the sensor surfaces (510, 512, or 514). In particular, the surface agent can bind as a monolayer over one or more of the surfaces. In particular, the surface agent includes a functional group reactive with the Bronsted base or Lewis acid functionality formed on the surfaces. An exemplary surface reactive functional group of the surface agent can include a silane, phosphates, phosphonic acid, phosphinic acid, bisphosphonic acid, multidentate phosphates or phosphonates, polyphosphates/phosphonates, isocyanate, catechol, hydroxamate, alkoxy derivatives thereof, or any combination thereof. Exemplary alkoxy groups include methoxy, ethoxy, or combinations thereof. In another example, a combination of a clodronic acid and a functionalized primary amine can be used in place of a surface reactive functional group. In an example, silanes can functionalize many ceramic and metallic surfaces. In a particular example, silanes, isocyanates, hydroxamates, and clodronic acid can functionalize silica surfaces. In another example, phosphates, catechols, and hydroxamates can be used to functionalize titania surfaces. In further examples, particular surface reactive functional groups may preferentially deposit on one or more metal or ceramic surfaces relative to other metal or ceramic surfaces.

Distal from the functional group, the surface agent can include a functional group that does not include a donor pair of electron or that lacks Bronsted base or acid activity. The distal functional group can be a positively charged functional group or can be a neutral functional group. Exemplary neutral functional groups include alkyl, branched alkyl, or cyclic aromatic groups. Exemplary positively charged groups that lack a donor pair of electrons include salts of quaternary ammonium ions derived from secondary amines, tertiary amines or heterocyclic groups incorporating nitrogen. In another example, the distal functional group can be a nitroso functional group. Exemplary heterocyclic groups incorporating nitrogen include quaternary amines derived from pyrrolidine, pyrrole, imidazole, piperidine, pyridine, pyrimidine, purine, triazolium, or combinations thereof. In particular, the salt can include a halide salt of the quaternary ammonium ions, such as a bromide salt. The secondary, tertiary, or quaternary amines can be conjugated to alkyl groups including methyl, ethyl, propyl, butyl, or tert-butyl alkyl groups. In another example, the distal functional group can include hindered primary, secondary or tertiary amines, such as amines hindered by proximal phosphate, phosphonate, phosphinate, or silane groups, or combinations thereof. In a particular example, the distal functional group can include biotin or a derivative thereof.

In an example, the distal functional group can be bound to the surface reactive functional group by an amide, alkyl, alkoxy, aryl, or polyether or thioether moiety, or a combination thereof. For example, the distal functional group can be separated from the surface reactive functional group by an alkyl moiety having 1 to 16 carbons, such as 1 to 12 carbons. In an example, the alkyl moiety can have 8 to 12 carbons, such as 10 to 12 carbons. In another example, the alkyl moiety can have 1 to 6 carbons, such as 1 to 4 carbons, or 1 to 3 carbons. In particular, surface agents including hindered amine distal functionality can have an alkyl moiety having 1 to 6 carbons, such as 1 to 4 carbons, or 1 to 3 carbons. In another example, the alkoxy moiety can have a number of carbons in a range similar to that of the alkyl moiety. In an additional example, a polyether moiety can have between 1 and 10 ether units, each having between 1 and 4 carbons, such as between 1 and 3 carbons. For example, the polyether moiety can have between 1 and 6 ether units, such as between 1 and 4 ether units.

Figure 8:
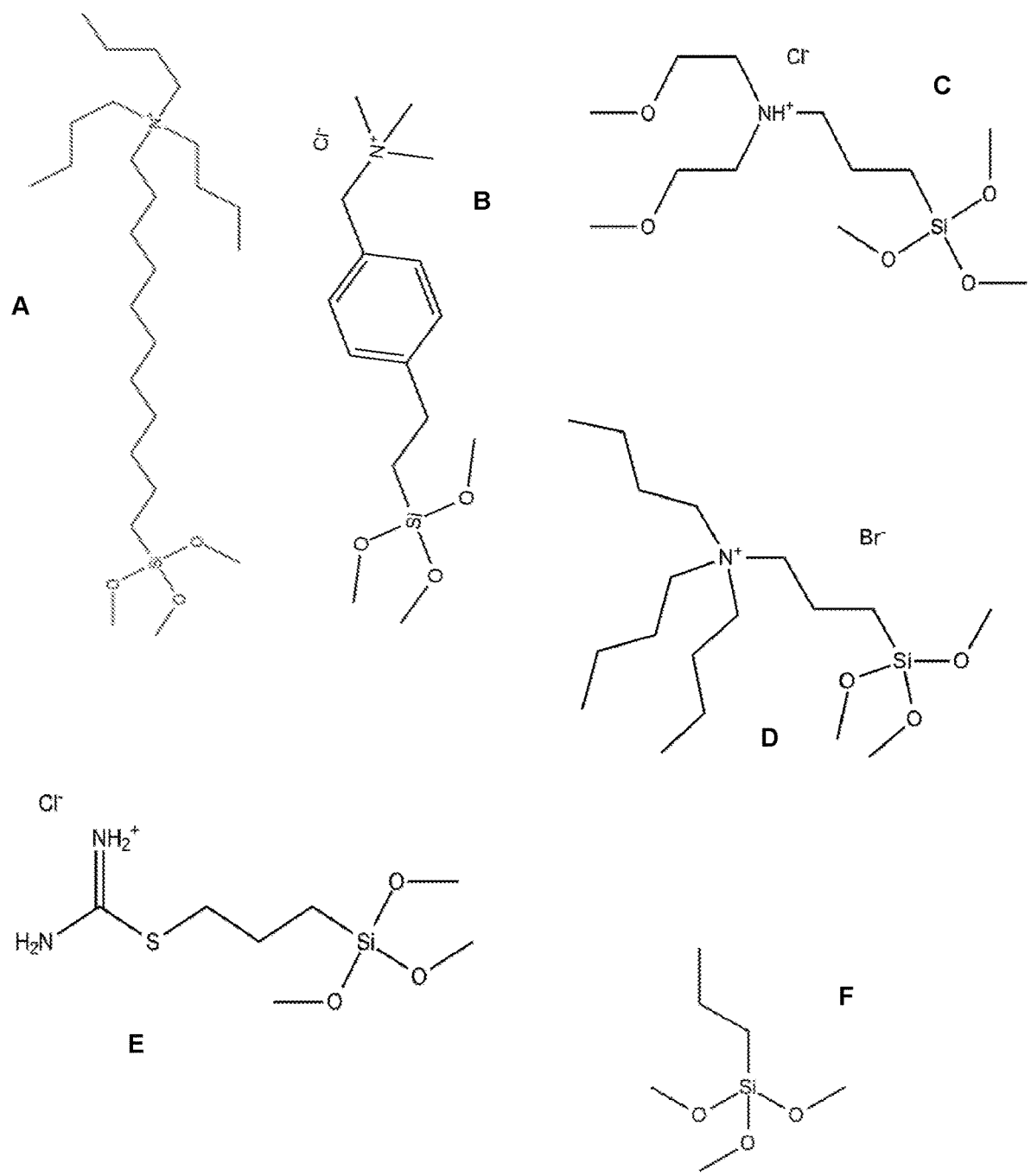
FIG. 8, FIG. 9, and FIG. 10 include illustrations of exemplary surface agents.

In a particular example, the surface agent includes a silane surface reactive functional group. Exemplary surface agents include alkyl trialkoxy silane, such as octyldecyl triethoxysilane, octyldecyl trimethoxy silanes, propyl trimethoxy silane (F of FIG. 8), or combinations thereof; salts of quaternary ammonium alkyl alkoxy silanes, such as butyl ammonium trimethoxy silane (A of FIG. 8), methyl ammonium benzo trimethoxy silanes (B of FIG. 8), uronium-silane or thiouronium-silane (E of FIG. 8), methoxy-N silane (C of FIG. 8), short butyl ammonium trimethoxy silanes (D of FIG. 8), or a combination thereof; fluorinated or chlorinated derivatives thereof; derivatives thereof; or combinations thereof. Exemplary quaternary salts include chlorine or bromine salts of such quaternary ammonium alkyl trialkoxysilanes. Such silane surface agents can bind to semi-metal or metal oxides. Some silane-based surface agents can bind indiscriminately to sidewalls surface or sensor surfaces.

Figure 9:
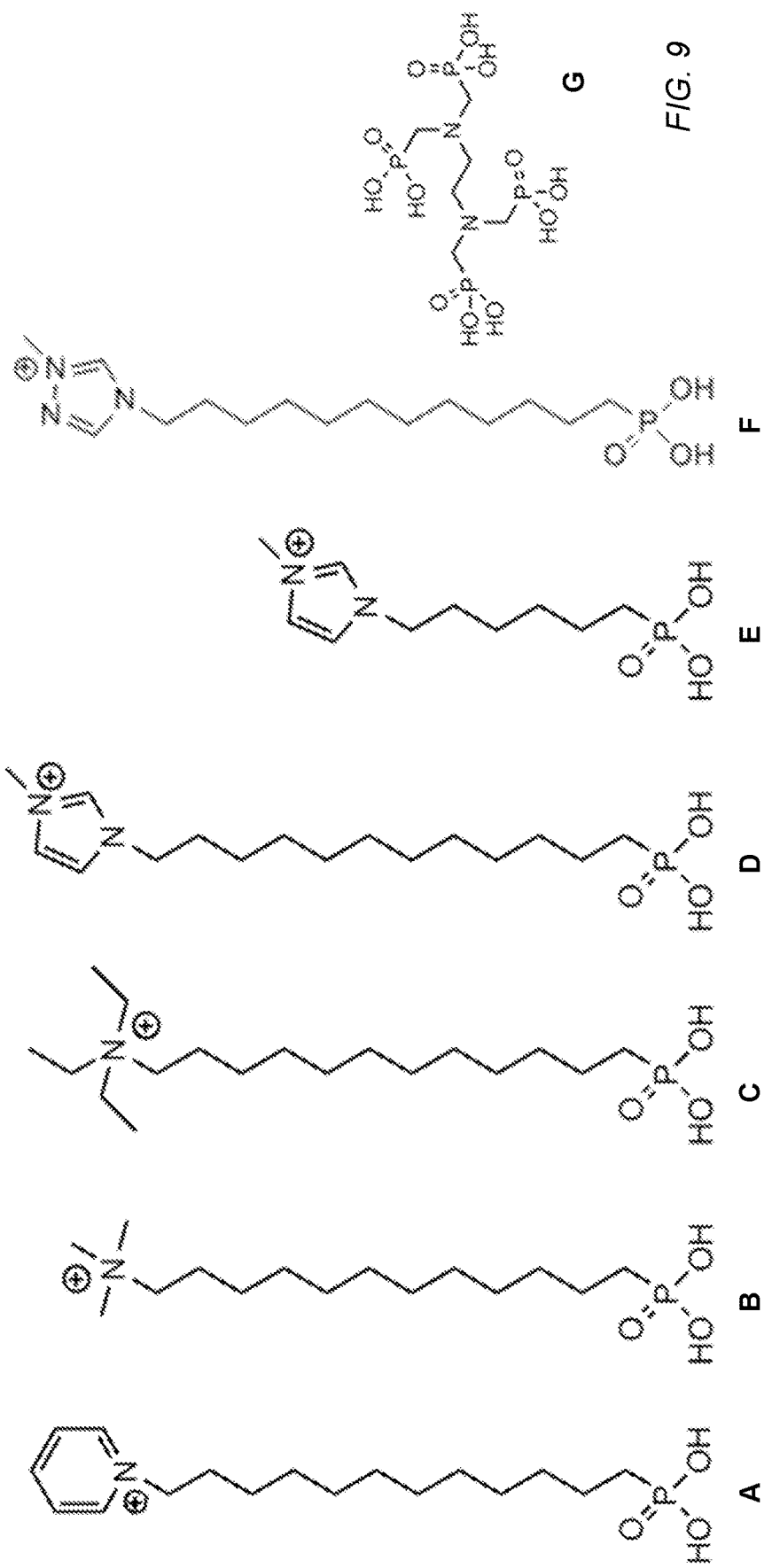
Figure 10:
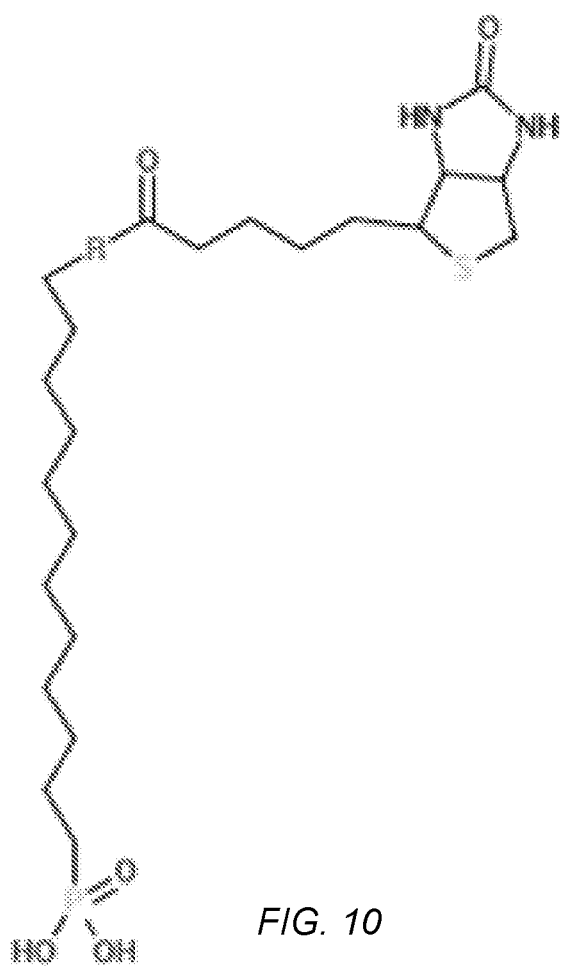

In another example, the surface agent can be a phosphonic acid-based surface agent. An exemplary surface agent includes alkyl phosphonic acids, such as octadecyl phosphonic acid; chlorine or bromine salts of quaternary amino phosphonic acids, such as imidazole phosphonic acids (e.g., 1-methyl-3-(dodecylphosphonic acid) imidazolium, see D of FIG. 9, or 1-methyl-3-(hexylphosphonic acid) imidazolium, see E of FIG. 9), (12-dodecylphosphonic acid) trimethylammonium bromide, methyl ammonium phosphonic acid (B of FIG. 9), ethyl ammonium phosphonic acid (C of FIG. 9), (12-dodecylphosphonic acid)tripropylammonium bromide, (12-dodecylphosphonic acid)tributylammonium bromide; (12-dodecylphosphonic acid) methyltriazolium bromide (F of FIG. 9); (6-hexylphosphonic acid) imidazolium; pyridine alkyl phosphonic acids (e.g., A of FIG. 9); benzo alkyl phosphonic acids; (1-amino-1-phenylmethyl) phosphonic acid; fluorinated or chlorinated derivatives thereof; derivatives thereof; or any combination thereof. In another example, the surface agent can be a biotin alkyl phosphonic acid (e.g., the structure of FIG. 10 in which R represents oxygen, nitrogen, sulfur, a polyether, or a combination thereof). In an example, phosphates and phosphonates can preferentially bind to sensor surfaces.

In a further example, the phosphonic acid-based surface agent can include more than one phosphonic acid surface active functional group. For example, the surface agent can be a bisphosphonic acid, including two phosphonic acid surface active functional groups, such as alendronic acid or a derivative thereof. In particular, the surface agent can be a multidentate phosphonic acid-based surface agent, for example, including more than one phosphonic acid functional group coupled to a central moiety functioning as the distal group, such as a tertiary amine or alkyldiamine. For example, the surface agent can be a functionalized amino bis(alkyl phosphonic acid), such as a biotin functionalized amino bis(methylene phosphonic acid), nitrilotris (alkyl phosphonic acid), e.g. nitrilotris (methylene phosphonic acid), an ether derivative thereof, or a combination thereof. In another example, the surface agent can be alkyldiamine tetrakis (alkyl phosphonic acid), such as ethylene diamine tetrakis (methylene phosphonic acid) (see G of FIG. 9). In a further example, the surface agent can be diethylenetriamine penta(methylene phosphonic acid), hexamethylenediamine tetra(methylene phosphonic acid), tetramethylenediamine tetra(methylene phosphonic acid), or any combination thereof. In an additional example, the surface agent is a phenyl diphosphonic acid, a functionalized derivative thereof, or a combination thereof.

In a further example, the surface agent can be a catechol, such as a catecholamine, nitrocatechol, nitrocatecholamine, derivatives thereof, or a combination thereof. For example, the catechol can include a dopamine, nitrodopamine, norepinephrine, epinephrine, esters thereof, or a combination thereof. In a particular example, the catechol is dopamine or nitrodopamine.

In an additional example, the surface agent can include an isocyanate or hydroxamate surface active functionality.

In particular, the surface agents can be applied over a sensor device. The sensor device can include a plurality of sensor pads and optionally wells defined over the sensor pads. The surface agent can be applied to adhere to the sidewalls of the wells, can be applied to the sensor pad surfaces, or a combination thereof. In an example, the sensor device includes a lid disposed over the wells and sensor pads and defines a flow volume or flow cell above the sensor pads and wells. The surface agent or a combination of surface agents can be applied in solution through the flow cell or flow volume to contact the wells or sensor pads.

For example, as illustrated in FIG. 6, a method 600 includes optionally warming a sensor component, as illustrated at 602. The sensor component can include a set of wells disposed over sensor pads and a lid defining a flow volume or flow cell over the wells and sensor pads. The sensor component can be warmed to a temperature in the range of 35° C. to 100° C., such as a temperature in a range of 40° C. to 75° C., or even a range of 45° C. to 65° C. Optionally, the temperature of the sensor component can be maintained at temperatures within the range throughout the process or fluids can be applied at temperatures within the range throughout the process.

As illustrated at 604, the sensor component can be washed. Optionally, the sensor component can be washed with an acid or base wash or a combination thereof. For example, the sensor component can be washed with a base solution, for example, including a sodium hydroxide solution having a concentration in a range between 50 mM and 2M, such as a concentration in a range of 50 mM to 1M, or a range of 50 mM to 200 mM. Following application of the base solution, the sensor component can be incubated in the presence of the base solution for a period in a range of 15 seconds to 5 minutes, such as a range of 30 seconds to 2 minutes, or a range of 45 seconds to 90 seconds.

Alternatively or in addition, the sensor component can be incubated in the presence of an acid solution. The acid solution can be an aqueous solution or can be a nonaqueous solution. In particular, the sensor component can be incubated in the presence of the acid solution for a period in a range of 30 seconds to 10 minutes, such as a range of 45 seconds to 5 minutes, or a range of 90 seconds to 150 seconds.

Exemplary acids in the acid solution can include sulfonic acid, phosphonic acid, or a combination thereof. The acid solution can further include an organic solvent. An exemplary sulfonic acid includes an alkyl sulfonic acid, an alkyl aryl sulfonic acid, or a combination thereof. An exemplary alkyl sulfonic acid includes an alkyl group having 1 to 18 carbons, such as 1 to 14 carbons, 1 to 10 carbons, or 1 to 5 carbons. In another example, the alkyl group of the alkyl sulfonic acid has 10 to 14 carbons. For example, an alkyl sulfonic acid can include methanesulfonic acid, ethanesulfonic acid, propane sulfonic acid, butane sulfonic acid, or combinations thereof. In another example, the alkyl group can be functionalized, for example, with a terminal functional group opposite the sulfonic acid functional group. An exemplary functionalized alkyl sulfonic acid includes an alkyl sulfonic acid functionalized with a terminal amine group, such as taurine. In a further example, the alkyl groups of the sulfonic acid can be halogenated, such as fluorinated.

In a further example, the sulfonic acid includes an alkyl aryl sulfonic acid. The alkyl aryl sulfonic acid, for example, alkyl benzene sulfonic acid, can include an alkyl group having between 1 and 20 carbons. For example, the alkyl group can have between 9 and 18 carbons, such as between 10 and 14 carbons. In a particular example, the alkyl aryl sulfonic acid includes dodecyl benzene sulfonic acid. The dodecyl benzene sulfonic acid can be a purified form of dodecyl benzene sulfonic acid having at least 90%, such as at least 95% of alkyl aryl sulfonic acid having an alkyl group with 12 carbons. Alternatively, the dodecyl benzene sulfonic acid can include a blend of alkyl benzene sulfonic acid having alkyl groups with an average of 12 carbons. The alkyl aryl sulfonic acid can be alkylated at a blend of positions along the alkyl chain. In another example, the alkyl group can have between 1 and 6 carbons. For example, the alkyl aryl sulfonic acid can include toluene sulfonic acid.

The acid solution can have a concentration between 10 mM and 500 mM acid, such as sulfonic acid. For example, the acid solution can have a concentration between 50 mM and 250 mM acid. In another example, the acid solution includes between 0.5 wt % and 25 wt % of the acid, such as sulfonic acid. For example, the acid solution can include between 1 wt % and 10 wt % of the acid, such as between 2.5 wt % and 5 wt % of the acid, such as sulfonic acid.

The organic solvent within the acid solution is a nonaqueous solvent providing solubility for the acid (e.g., sulfonic acid) to at least the concentrations above. In an example, the organic solvent can be aprotic. The organic solvent can be a non-polar organic solvent. In another example, the organic solvent can be a polar aprotic solvent. In an example, the organic solvent can have a normal boiling point in a range of 36° C. to 345° C. For example, the normal boiling point can be in a range of 65° C. to 275° C. In another example, the normal boiling point can be in a range of 65° C. to 150° C. Alternatively, the normal boiling point is in a range of 150° C. to 220° C.

In a particular example, the non-polar organic solvent includes an alkane solvent, an aromatic solvent, or a combination thereof. An alkane solvent can have between 6 and 20 carbons. For example, the alkane can have between 6 and 14 carbons, such as between 6 and 9 carbons. Alternatively, the alkane can have between 10 and 14 carbons. In a particular example, the alkane is a linear alkane. For example, the alkane solvent can include pentane, hexane, heptanes, octane, decane, undecane, dodecane, or combinations thereof. In another example, the alkane is halogenated. An exemplary branched alkane can include hydrogenated dimers of C11 or C12 alpha olefins.

In a further example, the organic solvent can include a polar aprotic solvent. For example, the polar aprotic solvent can include tetrahydrofuran, ethylacetate, acetone, dimethylformamide, acetonitrile, dimethyl sulfoxide, N-methyl pyrrolidone (NMP), or combinations thereof. In another example, the organic solvent can be free of ether solvents and, for example, can include dimethylformamide, acetonitrile, dimethyl sulfoxide, or combinations thereof.

Washing can also include washing using an alcohol, such as ethanol or isopropyl alcohol, or an alcohol/water mix. An alcohol wash is particularly useful when utilizing an acid solution in a nonaqueous solvent.

In a further example, washing the sensor component can include cycling through an acid solution wash, alcohol wash, or base solution wash one or more times, for example one time, two times, or three times. Alternatively, the system can utilize a single acid wash followed by an alcohol wash or a single base wash followed by an aqueous wash or alcohol/water wash.

Following the wash, the sensor component can optionally be washed with alcohol and dried, as illustrated at 606. For example, the sensor component can be further flushed with alcohol and the alcohol evaporated, for example, by a vacuum aspirating air through the flow cell or by applying dry nitrogen through the flow cell.

The surface agent can be applied to the chip, as illustrated at 608. For example, the surface agent can be incorporated into a solution, applied over the sensor component, and incubated on the sensor component for a period between 1 minute and 2 hours. For example, the sensor component can be incubated in the presence of the surface agent solution for a period in a range of 1 minute to 100 minutes, such as a range of 5 minutes to 75 minutes, a range of 5 minutes to 60 minutes, a range of 5 minutes to 30 minutes, or a range of 5 minutes to 15 minutes. The incubation temperature can be in a range of 35° C. to 100° C., such as a range of 40° C. to 80° C., or a range of 45° C. to 70° C.

In an example, the surface agent solution can include a solvent such as alcohol (e.g., ethanol or isopropyl alcohol), N-methyl pyrrolidone (NMP), dimethylformamide (DMF), or a combination thereof. Optionally the solution can include water. The surface agent can be included in amounts of 0.1% to 10% by weight, such as a range of 0.1% to 7% by weight. In particular, exemplary silane-based surface agents can be included in a solution in an amount in a range of 2% to 7% by weight, such as a range of 4% to 6% by weight. Exemplary phosphonic acid surface agents can be included in a range of 0.1% to 2% by weight, such as a range of 0.1% to 1% by weight, or a range of 0.3% to 0.8% by weight.

Following application of the surface agent, the sensor component can be washed and dried, as illustrated at 610. For example, the sensor component can be washed with alcohol, such as ethanol or isopropyl alcohol, and dried.

In another example, the surface agent can be applied at wafer level prior to singulating and forming a semiconductor chip sensor component. The wafer can include a plurality of die. Each die can include an array of sensors and a set of reaction sites defined in cooperation with the sensors. For example, wells can be formed in a surface layer to expose sensor pads of the sensors. In an example, the wafer can be treated in a manner similar to the sensor component as described in relation to FIG. 6 prior to singulating the wafer and subsequently packaging individual die into sensor components including a flow cell lid and substrate.

In another example, the wafer can be treated using an oxygen plasma followed by application of the surface agent. For example, FIG. 7 illustrates an exemplary method 700 that includes treating the wafer, and in particular, the wells and sensor surfaces of the wafer with an oxygen plasma, as illustrated at 702. In an example, the wafer is exposed to an oxygen plasma at 50 mtorr to 300 mtorr of oxygen, such as 100 mtorr to 200 mtorr, or 125 mtorr to 175 mtorr of oxygen, and 100 W to 500 W, such as 150 W to 450 W, or 200 W to 350 W for a period in a range of 1 minute to 10 minutes, such as a range of 2 minutes to 7.

As illustrated at 704, a surface agent solution can be applied to the wafer. The wafer can be inserted into a bath including a surface agent and a solvent solution. In an example, the solvent solution can include N-methyl pyrrolidone (NMP) and water. Alternatively, the solvent solution can include alcohol or an alcohol/water mixture. The surface agent can be included in the surface agent solution in a concentration in a range of 1 mg/ml to 10 mg/ml. For example, the concentration can be in a range of 1 mg/ml to 7 mg/ml, or a range of 2 mg/ml to 6 mg/ml. The bath can be held at a temperature in a range of 35° C. to 100° C., such as a range of 40° C. to 90° C., a range of 50° C. to 85° C., or a range of 60° C. to 80° C. The wafer can be incubated in the surface agent solution for a period between 10 minutes and 120 minutes, such as a period in a range of 30 minutes to 90 minutes, or a period in a range of 45 minutes to 75 minutes.

As illustrated at 706, the wafer can be washed and dried. For example, the wafer can be washed in an NMP/water solution and subsequently washed in water. The wafer can then be dried.

Optionally, the wafer can be annealed, as illustrated at 708. For example, the wafer can be held at an elevated temperature for an extended period. For example, the wafer can be annealed at a temperature in a range of 50° C. to 150° C., such as a temperature in a range of 70° C. to 135° C., or a range of 90° C. to 110° C. The wafer can be annealed in an air atmosphere. Alternatively, the wafer can be annealed in an inert atmosphere, such as a nitrogen atmosphere or a helium atmosphere. The wafer can be annealed for a period in a range of 30 minutes to 5 hours, such as a range of 1 hour to 4 hours.

As illustrated at 710, the wafer can be singulated into individual die. Each of the die can be packaged into sensor components, as illustrated at 712. For example, the die can be applied to a circuit substrate and wire bound to the substrate. A lid can be applied over the die to form a flow cell. Further, the substrate/die assembly can be encapsulated to further secure the die to the substrate and protect the wire bonds or interconnects.

Embodiments of the above described sensor components and methods provide technical advantages relating to increased key signal from the sensor component. In particular, the sensor component can exhibit higher key signal, faster response, and less buffering.

EXAMPLES

A sensor component is prepared using butyl ammonium trimethoxy silane (BATS) following the protocol below. The BATS is available from GELEST, part number SIT8422.0. Perform dodecyl benzene sulfonic acid (DBSA) treatment on the chip.
Attach port extender
2 min 5% DBSA (100 µL) in undecane at 50° C. (solution made fresh daily, stored at 50° C.)
Wash 2×200 µL isopropyl alcohol (IPA)
Wash 1×200 µL nanofiltered (NF) water
1 min 100 mM NaOH (200 µL)
Wash 1×200 µL NF water
Wash 1×200 µL IPA
Remove port extender and remove IPA under vacuum
Repeat twice more for a total of 3 DBSA/NaOH cycles.
Make a 5% BATS solution. To make 1 mL of solution: 200 µL BATS (25% in DMF) with 750 µL absolute ethanol and 50 µL NF water.
Place DBSA cleaned chip into 4 oz jar, equipped with a 1.5 mL tube filled 95% EtOH.
Add 200 µL of BATS solution to chip, making sure both the inlet and exit wells are completely filled.
Carefully seal jar with cap.
Place in 70° C. oven for 1 hour.
Remove jar from oven and take chip from jar.
Wash top and ports of chip with 1 mL ethanol (hold chip over large mouthed container).
Push 3×1 mL ethanol through chip using 1 mL pipette tip fitted with a filterless 20 µL tip.
Remove ethanol from chip with vacuum.

Example 2

A sensor component (ION Torrent™ Proton II available from Life Technologies Corporation) is treated with imidazole phosphoric acid (ImPA) using the following protocol. The ImPA solution includes 5 mg/mL ImPA in 50% isopropanol/50% diH2O.
Cleaning
1. Place chips on hotplate at 50° C. and allow to warm briefly (~30 seconds).
2. Add 100 µL 5% DBSA solution.
3. Incubate for 5 minutes.
4. Wash chip with 2×200 µL portions undecane.
5. Wash chip with IPA, dry by vacuum aspiration (or nitrogen flow if vacuum not available).
ImPA Deposition
1. Place cleaned, dried chips on hotplate at 50° C. and allow to warm briefly.
2. Load enough ImPA solution to fill the flow cell and both ports (~150 µL)
3. Incubate 10 minutes.
4. Empty ports by vacuum aspiration (or pipetting if vacuum not available).
5. Wash chip with 3×200 µL 50% isopropanol solution.
6. Wash chip with IPA, dry by vacuum aspiration (or nitrogen flow if vacuum not available).

Example 3

A sensor component (ION Torrent™ Proton II available from Life Technologies Corporation) is treated with 12-dodecylphosphonic acid trimethoxyammonium bromide (MAPA) using the following protocol. The MAPA solution includes 5 mg/mL ImPA in diH2O.
Cleaning—
1. Place chips on hotplate at 50° C. and allow to warm briefly (~30 seconds).
2. Add 100 µL 5% DBSA solution.
3. Incubate for 5 minutes.
4. Wash chip with 2×200 µL portions undecane.
5. Remove chip from hotplate and rinse with 200 uL undecane.
6. Rinse chip with 2×200 µL IPA followed by 200 uL of ultrapure water.
7. Wash chip with IPA, dry by vacuum aspiration (or nitrogen flow if vacuum not available).
MAPA Deposition—
1. Make a solution of 5 mg/mL in water (MAPA: 12-Dodecylphosphonic acid trimethoxyammonium bromide; SIK7722-10). Sonicate the solution briefly to fully dissolve the MAPA solid.
2. Place cleaned, dried chips in a sealable glass container, equipped with a 1.5 mL tube containing water.
3. Load enough MAPA solution into each chips to fill the flow cell and both ports (~150 µL)
4. Place the lid on the glass vessel and secure tightly.
5. Transfer container with chips to 90° C. oven and incubate for 1 hour.
6. Remove container from oven and chips from container.
7. Empty ports by vacuum aspiration (or pipetting if vacuum not available).
8. Wash chip with 3×200 µL 50% isopropanol solution.
9. Wash chip with IPA, dry by vacuum aspiration (or nitrogen flow if vacuum not available).

Example 4

A wafer including sensor die to be converted to sensor chips (ION Torrent™ Proton II sensors from Life Technologies Corporation) is treated with ImPA prior to dicing and packaging using the following process:
1. Oxygen plasma clean an 8 inch wafer containing die of MW sensor structures at 500 watts for 5 minutes at 200 mtorr.
2. Remove and immediately immerse wafer in 70° C. solution of 1 mg/mL ImPA in 50/50 NMP water for one hour.
3. Remove wafer and immediately immerse in a solution of 50/50 NMP/water to rinse. Agitate briefly.
4. Remove wafer and immerse in a bath of nanopure water.
5. Rinse with additional nanopure water.
6. Dry with a stream of nitrogen.
7. Anneal at 100° C. for two hours.

Example 5

A wafer including sensor die to be converted to sensor chips (ION Torrent™ Proton II sensors from Life Technologies Corporation) is treated with ImPA prior to dicing and packaging using the following process.
Run the plasma cleaner for one cycle prior to introducing the wafer (5 minutes, 300 watts, 150 mtorr oxygen). Place a wafer on center rack in the plasma cleaner. Run the plasma for 5 minute, 300 watt plasma clean with 150 mtorr of oxygen.
Make the following solution (5 mg/mL ImPA in 25% NMP/75% water): 1 gram ImPA, 50 mL NMP, and 150 mL nanopure water. Sonicate briefly to get the ImPA fully into solution.

Once the wafer is plasma cleaned, immediately place the wafer in pie dish and cover with the ImPA solution. Turn over a second pie dish to use as cover. Place in a 70° C. oven for 1 hour. Remove the covered pie dish from oven. Rinse the wafer by immersing in a clean pie dish containing fresh 25% NMP/75% water. Swirl to aid in rinsing. Rinse the pie dish containing ImPA with 25/75 NMP water mixture and fill with fresh 25/75 NMP to use as a second rinse bath. Transfer the wafer to second bath and swirl to aid rinsing. Repeat again with a third 25/75 NMP water bath.

After completing the three NMP/water rinses, transfer the wafer to a pie dish containing nanopure water for first water rinse. Swirl to aid rinsing. Complete two more water bath submersions with the wafer, for a total of 3 NMP/water rinses and 3 water only rinses (alternating the wafer between the two pie dishes used for the initial treatment).

Remove the wafer and dry with a nitrogen gas stream. Store in a wafer carrier for transport for assembly.

In a first aspect, a sensor component includes a sensor including a sensor surface; a reaction site in cooperation with the sensor and exposing the sensor surface, the reaction site including a reaction site surface; and a surface agent bound to the reaction site surface or the sensor surface, the surface agent including a surface active functional group reactive with Bronsted base or Lewis acid functionality on the reaction site surface or the sensor surface and including distal functionality that does not have a donor electron pair.

In a second aspect, a method of forming a sensor component includes treating a wafer with an oxygen plasma, the wafer including a plurality of die, each die of the plurality of die including a sensor array and a reaction site array in cooperation with the sensor array; and applying a surface agent to the wafer, the surface agent binding to a surface of the reaction site or a surface of sensors of the sensor arrays, the surface agent including a surface active functional group reactive with Bronsted base or Lewis acid functionality on the reaction site surface or the sensor surface and including distal functionality that does not have a donor electron pair.

In a third aspect, a method of treating a sensor component includes washing a sensor component, the sensor component including a sensor in cooperation with a reaction site, the sensor including a sensor surface and the reaction site including a reaction site surface; and applying a surface agent to the wafer, the surface agent binding to the reaction site surface or the sensor surface, the surface agent including a surface active functional group reactive with Bronsted base or Lewis acid functionality on the reaction site surface or the sensor surface and including distal functionality that does not have a donor electron pair.

In an example of the second and third aspects, the method further includes washing the sensor component with alcohol after applying the surface agent.

In another example of the second aspect and the above examples, the method further includes annealing the wafer after applying the surface agent.

In a further example of the second aspect and the above examples, the method further includes singulating the wafer into a plurality of die after applying the surface agent. For example, the method can further include packaging a die of the plurality of die.

In an example of the first, second, and third aspects and the above examples, the surface active functional group includes a silane, a phosphonic acid, or a combination thereof. For example, the surface active functional group includes a silane. In another example, the surface active functional group includes a phosphonic acid. In an additional example the distal functionality includes an alkyl group or a quaternary ammonium. For example, the quaternary ammonium is derived from a secondary, tertiary or heterocyclic amine. In an example, the heterocyclic amine includes pyrrolidine, pyrrole, imidazole, piperidine, pyridine, pyrimidine, purine, or combinations thereof.

In another example of the first, second, and third aspects and the above examples, the surface agent is an alkyl trialkoxy silane, a salt of a quaternary ammonium alkyl alkoxy silanes, a fluorinated or chlorinated derivative thereof, a derivative thereof, or a combination thereof.

In a further example of the first, second, and third aspects and the above examples, the surface agent is an alkyl phosphonic acid, a salt of quaternary amino phosphonic acids, a fluorinated or chlorinated derivative thereof, a derivative thereof, or a combination thereof.

In an additional example of the first, second, and third aspects and the above examples, the distal functionality has a positive charge.

In another example of the first, second, and third aspects and the above examples, the surface agent binds in a monolayer.

In a further example of the first, second, and third aspects and the above examples, the sensor includes a field effect transistor. For example, the field effect transistor includes an ion sensitive field effect transistor.

In an additional example of the first, second, and third aspects and the above examples, the sensor is part of a sensor array and wherein the reaction site is a well of an array of wells operatively coupled to the sensor array.

In another example of the first, second, and third aspects and the above examples, the surface agent binds to the sensor surface.

In a further example of the first, second, and third aspects and the above examples, the surface agent binds to the reaction site surface.

In a fourth aspect, a sensor component includes a sensor including a sensor surface, a reaction site in cooperation with the sensor and exposing the sensor surface, the reaction site including a reaction site surface, and a surface agent bound to the reaction site surface or the sensor surface. The surface agent includes a surface active functional group reactive with the sensor surface and includes distal functionality. The surface active functional group includes phosphate, phosphonic acid, phosphinic acid, a bisphosphonic acid, multidentate phosphates or phosphonates, polyphosphates/phosphonates, alkoxy derivatives thereof, or any combination thereof. The distal functionality includes an ammonium.

In a fifth aspect, a method of treating a sensor component includes washing a sensor component. The sensor component includes a sensor in cooperation with a reaction site. The sensor includes a sensor surface, and the reaction site includes a reaction site surface. The method further includes applying a surface agent to the wafer. The surface agent includes a surface active functional group reactive with the sensor surface and includes distal functionality. The surface active functional group includes phosphate, phosphonic acid, phosphinic acid, a bisphosphonic acid, multidentate phosphates or phosphonates, polyphosphates/phosphonates, alkoxy derivatives thereof, or any combination thereof. The distal functionality includes an amine.

In a sixth aspect, a method of forming a sensor component includes treating a wafer with an oxygen plasma. The wafer includes a plurality of die. Each die of the plurality of die includes a sensor array and a reaction site array in cooperation with the sensor array. The method further includes applying a surface agent to the wafer. The surface agent includes a surface active functional group reactive with the sensor surface and includes distal functionality. The surface active functional group includes phosphate, phosphonic acid, phosphinic acid, a bisphosphonic acid, multidentate phosphates or phosphonates, polyphosphates/phosphonates, alkoxy derivatives thereof, or any combination thereof. The distal functionality includes an amine.

In an example of the above aspects and examples, the surface active functional group includes a phosphate, phosphonic acid, a phosphinic acid, alkoxy derivatives thereof, or any combination thereof.

In another example of the above aspects and examples, the amine is derived from a secondary, tertiary or heterocyclic amine. For example, the heterocyclic amine includes pyrrolidine, pyrrole, imidazole, piperidine, pyridine, pyrimidine, purine, or combinations thereof.

In a further example of the above aspects and examples, the surface agent is an alkyl phosphonic acid, a salt of quaternary amino phosphonic acids, a fluorinated or chlorinated derivative thereof, a derivative thereof, or a combination thereof.

In an additional example of the above aspects and examples, the surface agent includes chlorine or bromine salts of quaternary amino phosphonic acids, methyl ammonium phosphonic acid, ethyl ammonium phosphonic acid, (12-dodecylphosphonic acid) methyltriazolium bromide, (6-hexylphosphonic acid) imidazolium, pyridine alkyl phosphonic acids, (1-amino-1-phenylmethyl) phosphonic acid, fluorinated or chlorinated derivatives thereof, derivatives thereof; or any combination thereof.

In another example of the above aspects and examples, the surface agent includes imidazole phosphonic acid.

In a further example of the above aspects and examples, the surface agent includes (12-dodecylphosphonic acid) methyltriazolium bromide.

In an additional example of the above aspects and examples, the surface agent includes a functionalized amino bis(alkyl phosphonic acid).

In another example of the above aspects and examples, the surface agent includes a bisphosphonic acid or a multidentate phosphonic acid. For example, the surface agent includes diethylenetriamine penta(methylene phosphonic acid), hexamethylenediamine tetra(methylene phosphonic acid), tetramethylenediamine tetra(methylene phosphonic acid), or any combination thereof.

In a further example of the above aspects and examples, the surface agent binds in a monolayer.

In an additional example of the above aspects and examples, the sensor includes a field effect transistor. For example, the field effect transistor includes an ion sensitive field effect transistor.

In another example of the above aspects and examples, the sensor is part of a sensor array and wherein the reaction site is a well of an array of wells operatively coupled to the sensor array.

In a further example of the above aspects and examples, the surface agent binds to the sensor surface.

In an additional example of the above aspects and examples, the surface agent binds to the reaction site surface.

In an example of the fifth aspect and above examples, the method further includes washing the sensor component with alcohol after applying the surface agent.

In another example of the above aspects and examples, wherein the distal functionality has a positive charge.

In an example of the sixth aspect and above examples, the method further includes annealing the wafer after applying the surface agent.

In another example of the sixth aspect and above examples, the method further includes singulating the wafer into a plurality of die after applying the surface agent. For example, the method further includes packaging a die of the plurality of die.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of preparing a sensor component, the method comprising:
   flowing a wash solution over a sensor device, the sensor device including:
     a sensor array; each sensor in the sensor array having a sensor surface comprising a metal, metal or semi-metal oxide, or metal or semi-metal nitride; and an array of wells formed over and operatively coupled to the sensor array, each well providing a sidewall of a reaction site; and applying a surface agent to the sensor device, the surface agent including:
- a first moiety reactive with the sensor surface, the sidewall, or combinations thereof;
- the first moiety including phosphate, phosphonic acid, phosphinic acid, and phosphonate, or any combination thereof; and
- a second moiety distal from the first moiety comprising a positively charged functional group.

2. The method of claim 1, wherein applying the surface agent to the sensor device comprises flowing a surface agent solution over the sensor device; the surface agent solution comprising a surface agent concentration of between 1 mg/ml to 10 mg/ml.

3. The method of claim 2, wherein flowing the surface agent solution over the sensor device further comprises maintaining the surface agent solution at a temperature of 40° C. to 90° C.

4. The method of claim 3, wherein flowing the surface agent solution over the sensor device further comprises incubating the sensor device in the surface agent solution for between 1 to 30 minutes.

5. The method of claim 1, wherein the surface agent is an alkyl phosphonic acid, a salt of quaternary amino phosphonic acid, a fluorinated or chlorinated derivative thereof, a derivative thereof, or any combination thereof.

6. The method of claim 5, wherein the surface agent includes-methyl ammonium phosphonic acid, ethyl ammonium phosphonic acid, (12-dodecylphosphonic acid) methyltriazolium bromide, (6-hexylphosphonic acid) imidazolium, pyridine alkyl phosphonic acids, (1-amino-1-phenylmethyl) phosphonic acid, fluorinated or chlorinated derivatives thereof, or any combination thereof.

7. The method of claim 1, wherein the surface agent includes imidazole phosphonic acid.

8. The method of claim 1, wherein the surface agent includes a bisphosphonic acid or a multidentate phosphonic acid.

9. The method of claim 8, wherein the surface agent includes ethylene diamine tetrakis(methylene phosphonic acid), diethylenetriamine penta(methylene phosphonic acid), hexamethylenediamine tetra(methylene phosphonic acid), tetramethylenediamine tetra(methylene phosphonic acid), or any combination thereof.

10. The method of claim 1, wherein the second moiety is an amine derived from a secondary, tertiary or heterocyclic amine.

11. The method of claim 10, wherein the heterocyclic amine includes pyrrolidine, pyrrole, imidazole, piperidine, pyridine, pyrimidine, purine, or combinations thereof.

12. The method of claim 1, wherein the sensor array is a field effect transistor (FET) sensor array.

13. The method of claim 12, wherein the FET sensor array is an ion sensitive field effect transistor (ISFET) sensor array.

14. The method of claim 1, wherein flowing a wash solution over the sensor device comprises flowing a base solution over the sensor device.

15. The method of claim 14, wherein flowing the base solution over the sensor device is done for between 15 seconds to 5 minutes.

16. The method of claim 14, wherein flowing the base solution over the sensor device comprises flowing a sodium hydroxide solution over the sensor device.

17. The method of claim 1, wherein flowing a wash solution over the sensor device comprises flowing an acid solution over the sensor device.

18. The method of claim 17, wherein flowing the acid solution over the sensor device is done for between 30 seconds to 10 minutes.

19. The method of claim 17, wherein flowing the acid solution over the sensor device comprises flowing a sulfonic acid solution over the sensor device.

20. The method of claim 19, wherein flowing the acid solution over the sensor device comprises flowing a dodecyl benzene sulfonic acid solution over the sensor device.

21. The method of claim 20, wherein flowing the dodecyl benzene sulfonic acid solution over the sensor device comprises flowing a dodecyl benzene sulfonic acid solution of between 1 wt. % to 10 wt. % over the sensor device.

* * * * *